(12) United States Patent
Andersen et al.

(10) Patent No.: US 9,072,985 B2
(45) Date of Patent: Jul. 7, 2015

(54) PLATE EVAPORATOR OF THE FALLING FILM TYPE, AND A PLATE EVAPORATOR APPARATUS HAVING SUCH A PLATE EVAPORATOR ARRANGED IN A HOUSING

(75) Inventors: Bo Juul Andersen, Snekkersten (DK); Ralf Blomgren, Skanör (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 14/346,569

(22) PCT Filed: Sep. 13, 2012

(86) PCT No.: PCT/EP2012/067965
§ 371 (c)(1),
(2), (4) Date: May 8, 2014

(87) PCT Pub. No.: WO2013/041441
PCT Pub. Date: Mar. 28, 2013

(65) Prior Publication Data
US 2014/0251550 A1 Sep. 11, 2014

(30) Foreign Application Priority Data
Sep. 22, 2011 (EP) .................................. 11182336

(51) Int. Cl.
*B01D 1/22* (2006.01)
*B01D 5/00* (2006.01)
(Continued)

(52) U.S. Cl.
CPC ............... *B01D 1/22* (2013.01); *B01D 5/0015* (2013.01); *B01D 1/0064* (2013.01); *B01D 1/221* (2013.01);
(Continued)

(58) Field of Classification Search
CPC ........ B01D 1/0064; B01D 1/22; B01D 1/221; B01D 5/0015; C02F 1/08; F28D 9/0006; F28D 9/0043; F28D 9/005; F28D 2021/0064; F28D 2021/0066

USPC ............................ 159/13.1, 28.6, 49; 165/167
See application file for complete search history.

(56) References Cited

U.S. PATENT DOCUMENTS 4,287,945 A * 9/1981 Hessari .......................... 165/167
(Continued)

FOREIGN PATENT DOCUMENTS

DE 937328 C 1/1956
(Continued)

OTHER PUBLICATIONS

International Search Report (PCT/ISA/210) mailed on Jul. 19, 2013, by the European Patent Office as the International Searching Authority for International Application No. PCT/EP2012/067965.
(Continued)

*Primary Examiner* — Nina Bhat
*Assistant Examiner* — Jonathan Miller
(74) *Attorney, Agent, or Firm* — Buchanan Ingersoll & Rooney PC

(57) ABSTRACT

A plate evaporator apparatus of the falling film type comprises a housing having an inlet for liquid to be evaporated and having mounted therein a package of heat transferring plates with plate interspaces, every second one of which forms an evaporation space for at least partial evaporation of liquid and the other plate interspaces forming condensation spaces for at least partial condensation of a heat emitting vapor. First seals delimit distribution chambers, each of which is in liquid flow communication with at least one evaporation space by flow ways spaced apart along the package width. The heat transferring plates have through openings aligned to form a passage extending through the plate package. A pipe is connected to the inlet and has apertures distributed along its length in flow communication with the distribution chambers, for supplying the liquid to be evaporated from the inlet to the distribution chambers through the apertures.

15 Claims, 7 Drawing Sheets

(51) Int. Cl.
*C02F 1/08* (2006.01)
*B01D 1/00* (2006.01)
*F28F 9/02* (2006.01)
*F28D 9/00* (2006.01)
*F28D 1/02* (2006.01)
*F28D 21/00* (2006.01)

(52) U.S. Cl.
CPC ............ *F28F 9/0273* (2013.01); *F28D 9/0006* (2013.01); *F28D 9/0043* (2013.01); *F28D 2021/0066* (2013.01); *F28D 2021/0064* (2013.01); *F28D 1/022* (2013.01); *C02F 1/08* (2013.01)

(56) References Cited

U.S. PATENT DOCUMENTS

| | | | | |
|---|---|---|---|---|
| 4,303,124 A | * | 12/1981 | Hessari | 165/167 |
| 5,203,406 A | | 4/1993 | Blomgren et al. | |
| 5,509,471 A | * | 4/1996 | Hallgren | 165/167 |
| 5,597,453 A | * | 1/1997 | Sears | 203/24 |
| 5,806,586 A | * | 9/1998 | Osthues et al. | 165/174 |
| 7,476,298 B2 | * | 1/2009 | Stout | 202/174 |
| 8,240,367 B2 | * | 8/2012 | Wanni et al. | 165/174 |
| 2002/0174978 A1 | | 11/2002 | Beddome et al. | |
| 2003/0010483 A1 | * | 1/2003 | Ikezaki et al. | 165/174 |
| 2003/0094270 A1 | | 5/2003 | Holm et al. | |
| 2009/0000777 A1 | | 1/2009 | Wanni et al. | |
| 2012/0061064 A1 | | 3/2012 | Strömer et al. | |

FOREIGN PATENT DOCUMENTS

| | | |
|---|---|---|
| DE | 4422178 A1 | 1/1995 |
| GB | 1 299 481 A | 12/1972 |
| JP | 11-148797 A | 6/1999 |
| WO | WO 91/06818 A1 | 5/1991 |
| WO | WO 93/14363 A1 | 7/1993 |
| WO | 94/14021 A1 | 6/1994 |
| WO | WO 2009/062738 A1 | 5/2009 |

OTHER PUBLICATIONS

Written Opinion (PCT/ISA/237) mailed on Jul. 19, 2013, by the European Patent Office as the International Searching Authority for International Application No. PCT/EP2012/067965.

* cited by examiner

PLATE EVAPORATOR OF THE FALLING FILM TYPE, AND A PLATE EVAPORATOR APPARATUS HAVING SUCH A PLATE EVAPORATOR ARRANGED IN A HOUSING

TECHNICAL FIELD

The present invention concerns a plate evaporator of the falling film type, and a plate evaporator apparatus having such a plate evaporator arranged in a housing.

More specifically, the plate evaporator of the invention is of the kind comprising a package of substantially vertically arranged heat transferring plates with plate interspaces, every second one of which forms an evaporation space for at least partial evaporation of said liquid and the other plate interspaces forming condensation spaces for at least partial condensation of a heat emitting vapour, and further comprising first seals which in an upper part of said plate interspaces forming evaporation spaces delimit distribution chambers, each of which being in relatively restricted liquid flow communication with at least one evaporation space through flow ways spaced apart along the width of the package, the heat transferring plates having through openings aligned to form a passage which extends through the plate package.

The invention also concerns the use of such a plate evaporator for the desalination of sea water.

The invention is primarily concerned with plate evaporators of the aforementioned type where the liquid evaporated in the evaporation spaces is condensed, collected and used in industrial processes not related to the plate evaporator as such, eg. as cooling water in power plants, or for human consumption. The liquid may by way of example be pressed juice with pulp, or sea water.

BACKGROUND OF THE INVENTION

GB 1,299,481 shows a plate evaporator of the above kind. Evaporation liquid flows towards the evaporation spaces inside a channel which is defined in part by the aligned openings that form the passage through the heat transferring plates. Each of the distribution chambers are in restricted liquid flow communication with at least one evaporation space, by means of narrow flow ways/small through holes formed in the heat transferring plates or in the aforementioned seals, as shown in FIG. 1b of GB 1,299,481, whereby the liquid flows over the surfaces defining the evaporation spaces in the form of a falling film. Through the size of the flow ways/through holes it may be ensured that about the same amount of liquid flows from the channel and into the individual evaporation spaces along the entire length of the channel.

It is a problem with such plate evaporators that particles suspended in the liquid may lead to a clogging of the aforementioned flow ways, affecting the falling film of liquid. In addition, due to the low rate of flow in the individual distribution chambers sedimentation of the suspended particles may also occur in the distribution chambers. Simply increasing the size of the flow ways/through holes to a size that still provides for a falling film may be desirable to reduce clogging; however, making the through holes larger may cause a relatively larger amount of the liquid to flow into those evaporation spaces that are located closest to the inlet, thereby reducing the overall efficiency of the evaporator.

Attempts to avoid clogging have been made by arranging filters upstream of the plate evaporator. However, in some applications space constraints and/or the nature of the liquid to be evaporated are such that clogging can still not be prevented, even if a filter of some kind is provided. One example is desalination applications where the plate evaporator is used on board a ship or similar places where available space for high grade filters is limited, and where the liquid to be evaporated is sea water. In coast-near areas sea water may contain silt having a particle size of 5-10µ; the sea water may also contain algae of the same particle size. Algae passing through even a fine mesh filter has a tendency to agglomerate, and such agglomerates have often been found to be the cause of clogging, requiring a time consuming and costly dismantling and cleaning of the heat transferring plates.

SUMMARY OF THE INVENTION

A main object of the present invention is to provide a plate evaporator and a plate evaporator apparatus of the initially described kind, in which liquid to be evaporated may still be reliably distributed effectively to the various evaporation spaces in the plate package and where maintenance and cleaning of the plate evaporator is simplified.

An object of the invention is also to allow for an easy cleaning of the package, where space constraints are such that any dismantling of the package for cleaning would otherwise be difficult.

The above objects may be obtained in a plate evaporator and a plate evaporator apparatus of the initially defined kind, which is characterized in an elongated pipe connected to the inlet and extending in the passage along a length thereof, the pipe having a peripheral wall with apertures distributed along the length of the pipe and being in flow communication with the distribution chambers, for supplying the liquid to be evaporated from the inlet to the distribution chambers through the apertures. The pipe may be removably mounted in the passage to allow for a cleaning of the pipe at another location, and the apertures may be of increasing size from the end connected to the inlet and towards the opposite end. Preferably, the pipe is placed such that the apertures are aligned with the distribution chambers and the pipe extends along the full length of the passage and has a first end connected to the inlet and a normally closed openable fluid flow port at the opposite end. This allows for a flushing of the pipe, either in-situ or at another location after removal of the pipe, to flush out any particles that have settled in the pipe.

According to an embodiment the pipe apertures may be formed exclusively in the upper half perimeter part of the pipe. This provides for an enlarged capacity for settled particles without any significant limitation on the flow through the pipe and into the distribution chambers.

In the manner shown in WO91/06818 at least two second seals may be arranged in the upper part of each condensation space, horizontally spaced from each other seen along the width of the heat transferring plates, each of the sealing means delimiting between the heat transferring plates a transferring chamber which is closed from connection with other parts of the condensation space, that the condensation spaces communicate with the surrounding of the plate package through the gaps formed between said sealing means for receiving heat emitting vapour from above, and that the heat transferring plates have through holes communicating with the transferring chambers, for each transferring chamber at least one first hole connecting the transferring chamber with a distribution chamber and at least one second hole connecting the transferring chamber with one evaporation space.

According to a preferred embodiment of the invention the apparatus includes a filter for the liquid to be evaporated and located upstream of the pipe, such as at a location outside the housing. This will ensure that only the smallest size particles are collected in the pipe by sedimentation.

The pipe may be easily elastically bendable, or it may be defined by a series of sealingly interconnected shorter pipe section. This is of particular advantage when the apparatus comprises several housings or packages arranged spaced apart in an end-to-end relationship. In this way the pipe, which may extend for a length of eg. 1-3 m, can be pulled lengthwise out of its receiving passage and free of the package, even when the space between adjoining housings or packages is significantly less than the pipe length, by bending the pipe transversally, or by disassembling the pipe.

BRIEF DESCRIPTION OF THE DRAWINGS

An embodiment of the invention is described below with reference to the accompanying drawing, in which

FIG. 1 shows a component of a plate evaporator apparatus in the form of a closed container or housing 1 shaped as a cylindrical pressure vessel provided with end walls, a plate heat exchanger being arranged within the container. The plate heat exchanger comprises two end plates 2 and 3 and a package of heat transferring plates 4 which are clamped conventionally between the end plates. The apparatus or housing 1 may be compartmentalized and contain several packages with corresponding end plates placed spaced apart in the individual compartments in an end to end relationship. The packages may have a length between the end plates 2, 3 of eg. 2 m, a height of eg. 1.5 m, and a width normal to the plane of FIG. 1 in the order of eg. 1 m. The end plates 2, 3 as well as the heat transferring plates 4 are carried within the housing, or the compartments of the housing, by a frame which is not shown in the drawing, so that they extend vertically. Spacing members, preferably pressed in the heat transferring plates in a conventional manner, keep the heat transferring plates at a distance from each other, so that plate interspaces to be flowed through by heat exchange fluids are formed.

Figure 1:
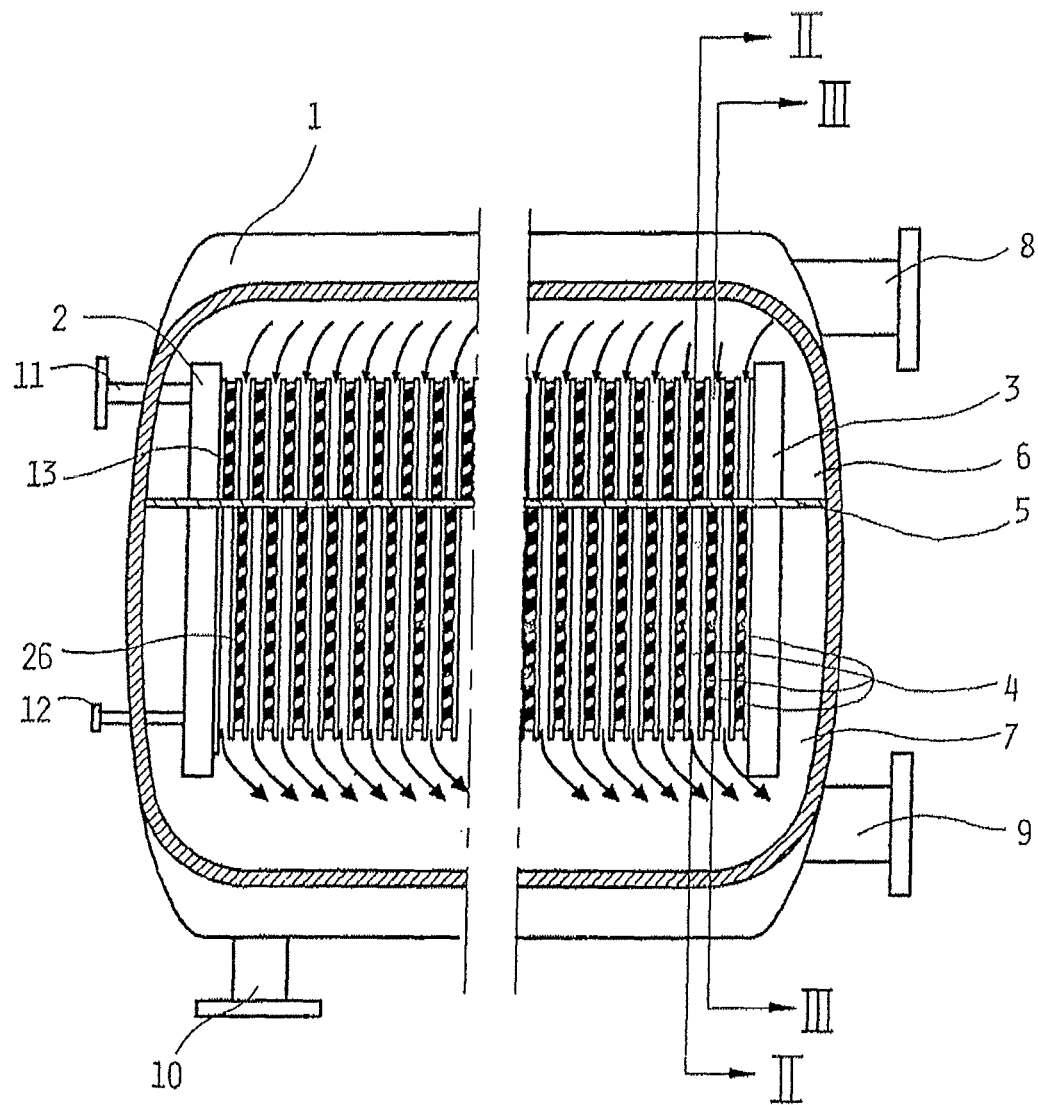
FIG. 1 shows a housing and a plate heat exchanger arranged therein.

A horizontal partition 5 extends within the container 1 all the way around the plate heat exchanger, so that it divides the interior of the container in an upper chamber 6 and a lower chamber 7. The upper chamber 6 has an inlet 8 for heat emitting vapour and the lower chamber 7 has an outlet 9 for vapour having been generated in the plate heat exchanger. At its bottom the container 1 has a further outlet 10 from the lower chamber 7, which is intended for liquid having been supplied to but not been evaporated in the plate heat exchanger.

Through one end wall of the container there are extending one inlet pipe 11 and two outlet pipes 12, the inlet pipe 11 forming an inlet to the plate heat exchanger for liquid to be evaporated therein, and the pipes 12 forming outlets for condensate formed in the plate heat exchanger.

Between the heat transferring plates 4 there are arranged sealing members of different kinds. These are described below with reference to FIGS. 2 and 3.

Figure 2:
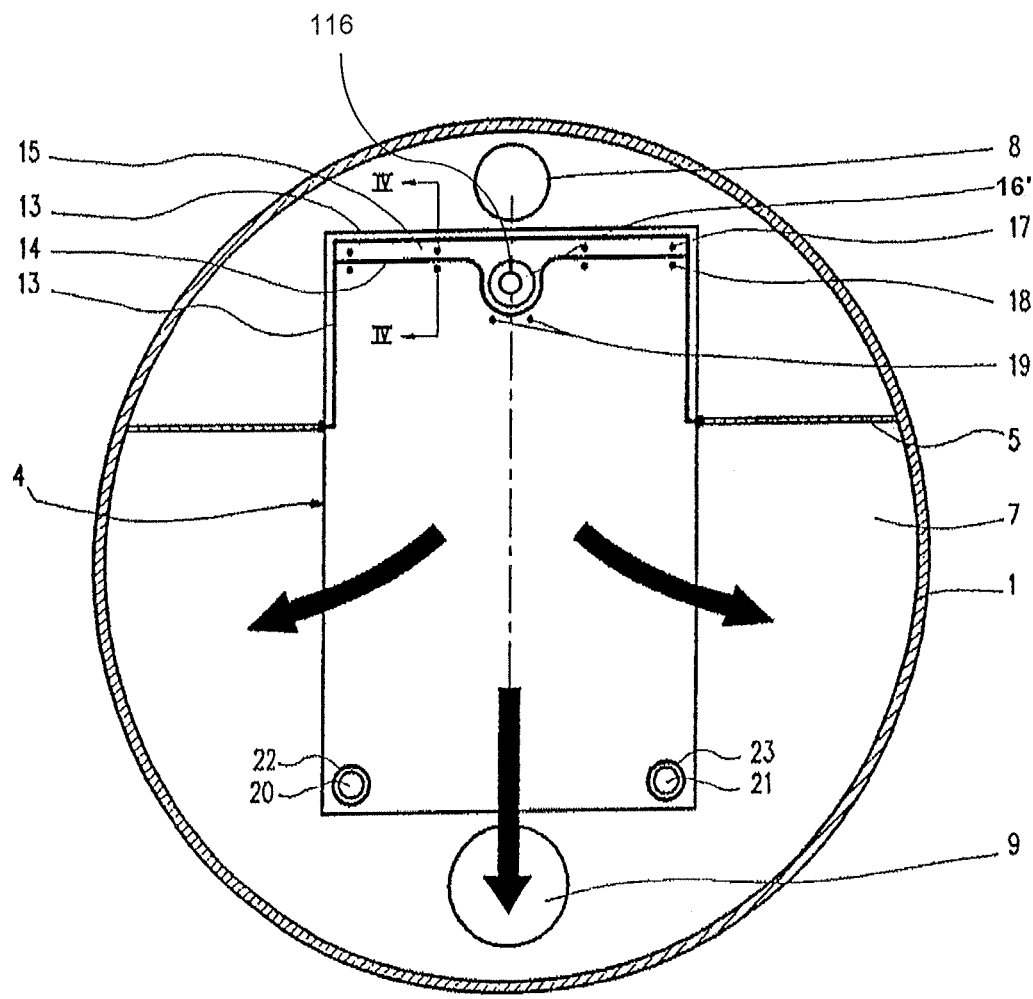
FIG. 2 shows a cross-sectional view along the line II-II in FIG. 1.

FIG. 2 shows one side of a heat transferring plate 4 which has a width and a height defining the width and the height of the package of heat transferring plates. As can be seen the heat transferring plate has an elongated rectangular form and is arranged in the container 1 such that its long sides extend vertically and its short sides extend horizontally. The partition 5 extends at a certain level in the container 1 from each of the long sides of the heat transferring plates 4 horizontally towards the surrounding wall of the container 1.

On its side shown in FIG. 2 the heat transferring plate 4 has a first seal or gasket 13 extending along the edge of the heat transferring plate upwardly from the level of the partition 5 at one long side of the plate, then along the upper short side of the plate and back downwardly along the other long side of the plate to the level of the partition 5. As can be seen from FIG. 2, the gasket 13 extends at the long sides of the heat transferring plate horizontally up to the respective parts of the partition 5.

A second seal or gasket 14 extends in parallel with the upper short side of the heat transferring plate between the vertical portions of the gasket 13, so that an area 15 of the upper part of the heat transferring plate is completely surrounded by the gaskets 13 and 14. When the gaskets 13 and 14 abut against the plate shown in FIG. 2 as well as an adjacent plate in the plate heat exchanger, a closed so called distribution chamber will be formed in the plate interspace in the area 15, which extends across the whole width of the heat transferring plates.

In the area 15 the heat transferring plate 4—like all of the heat transferring plates in the plate heat exchanger—has a through opening 16. All of the openings 16 together form a passage 16' through the package of heat transferring plates 4, in the upper part thereof, such as in the upper ⅕ part. A pipe 116, such as a plastic material pipe, connected to the inlet 11 and to be discussed below with reference to FIG. 5 extends along the passage 16' between the two end plates 2, 3. The pipe 116 communicates both with the previously mentioned inlet 11 (FIG. 1) for liquid to be evaporated and with each of the distribution chambers.

In addition to the opening 16 each heat transferring plate has in the area 15 and close to the gasket 14 four small flow ways in the form of through holes 17 distributed across the width of the plate. Vertically below each of the holes 17 on the opposite side of the gasket 14 there is a further small flow way in the form of a through hole 18. Finally, close to the large opening 16 but below the gasket 14 there are two small flow ways in the form of through holes 19. The flow ways have a diameter in the area of 2-3 mm.

Each heat transferring plate in its lower corner has two through holes 20 and 21, which on the plate side shown in FIG. 2 are surrounded by two annular gaskets 22 and 23, respectively. The holes 20 and 21 in the heat transferring plates form two channels through the plate package, which communicate with the outlets 12 of the plate heat exchanger for liquid having been condensed but which are closed by the gaskets 22 and 23, respectively, from connection with the plate interspaces in which these gaskets are arranged.

Figure 3:
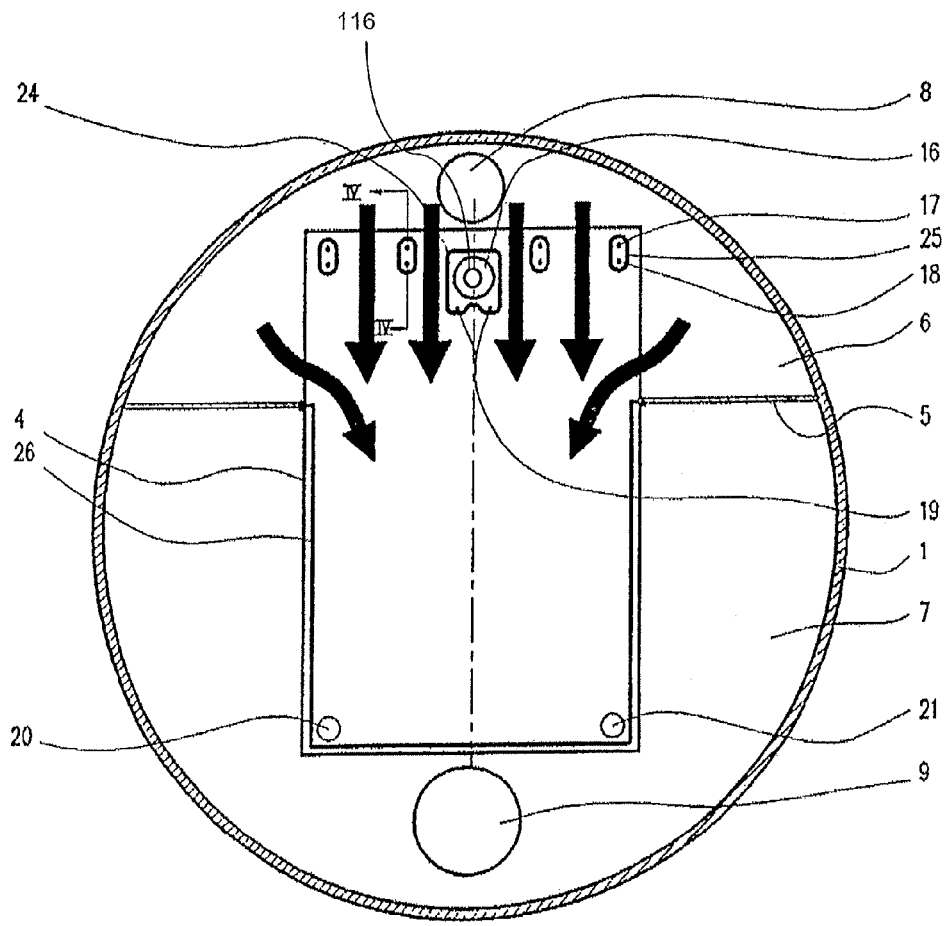
FIG. 3 shows a cross-sectional view along the line III-III in FIG. 1.

FIG. 3 shows one side of a heat transferring plate 4 which is intended to be placed behind a heat transferring plate according to FIG. 2. As can be seen, the plate in FIG. 3 has in its upper part, such as in the upper ⅕ of the plate, a relatively large opening 16 and the flow ways in the form of substantially smaller holes 17, 18 and 19. Also, the plate in FIG. 3 has through holes 20 and 21 at its lower corners. In these respects the plates in FIG. 2 and FIG. 3 are thus alike. The plate according to FIG. 3, however, has a different arrangement of gaskets than the plate according to FIG. 2.

In the upper part of the plate in FIG. 3 the opening 16 and the two small holes 19 are surrounded by a first gasket 24. Furthermore, there are in the upper part of the plate four horizontally spaced gaskets 25. Each of these surrounds a small area of the plate, in which there are both one hole 17 and one hole 18.

In the lower part of the plate in FIG. 3 a gasket 26 extends along the edge of the plate downwardly from the level of the partition 5 at one long side of the plate, then along the lower short side of the plate and again upwardly along the other long side of the plate to the level of the partition 5. As can be seen, the gasket 26 extends at the level of the partition 5 horizontally up to the respective portions of the partition 5. The holes 20 and 21 at the lower corners of the plate are placed inside, i.e. above, the gasket 26.

Figure 4:
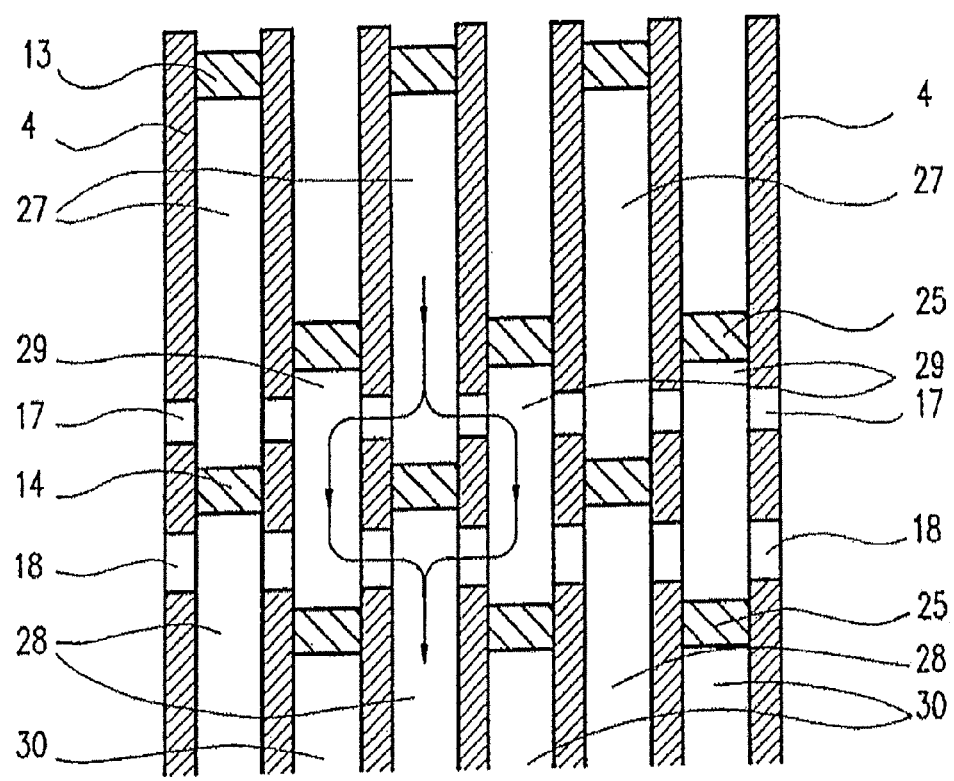
FIG. 4 shows a section through the upper part of a plate heat exchanger according to FIG. 1, which section is taken along a line IV-IV in FIG. 2 and a corresponding line IV-IV in FIG. 3.

FIG. 4 shows a section through the upper parts of a number of heat transferring plates, which section is taken along the line IV-IV in FIG. 2 and along a corresponding line IV-IV in FIG. 3.

In every second plate interspace there is shown in FIG. 4 a section through the upper part of a gasket 13 (FIG. 2) and a section through a gasket 14 (FIG. 2). Between the gaskets 13 and 14 there is formed in each such plate interspace a distribution chamber 27 which extends across the whole width of the heat transferring plates 4. The distribution chamber 27 communicates with the passage 16' through the plate package, which is formed by the openings 16 in the plates.

Below the gasket 14 there is formed in each of these plate interspaces an evaporation space 28 in which liquid is to be evaporated. Each evaporation space 28 is closed from connection with the upper chamber 6 in the container 1 by the vertical parts of the gasket 13 (FIG. 2) but communicates with the lower chamber 7 in the container 1 through the slots between the edges of the heat transferring plates—along the lower parts of the plate long sides as well as along the lower short sides of the plates. This is illustrated by means of arrows in FIG. 2.

In each of the rest of the plate interspaces there is shown in FIG. 4 a section through a gasket 25 (FIG. 3), which together with the two heat transferring plates against which it seals forms a transferring chamber 29. Outside the gasket 25 there is formed in the interspace between the two heat transferring plates a condensation space 30. The condensation space 30 communicates with the upper chamber 6 in the container 1 through the slots between the two heat transferring plates along the upper short sides thereof as well as along the upper parts of their long sides. This is illustrated by means of arrows in FIG. 3. Vapour in the chamber 6 thus may flow into each condensation space 30 both from the two sides of the plate package and from above through the interspaces between adjacent gaskets 25.

Each condensation space 30 is closed by the gasket 26 (FIG. 3) from connection with the lower chamber 7 in the container 1.

All of the plate interspaces forming condensation spaces 30, as well as the upper chamber 6 in the container 1, are closed by the gaskets 24 (FIG. 3) from connection with the passage 16' through the plate package, which is formed by the openings 16 in the heat transferring plates.

As illustrated by arrows in FIG. 4, each distribution chamber 27 communicates through holes 17 in two adjacent heat transferring plates with two transferring chambers 29. Through opposing holes 18 in the same heat transferring plates the two said transferring chambers 29 communicate with the evaporation space 28 that is formed between the two heat transferring plates. The holes 18 have somewhat larger throughflow area than the holes 17.

Figure 5:
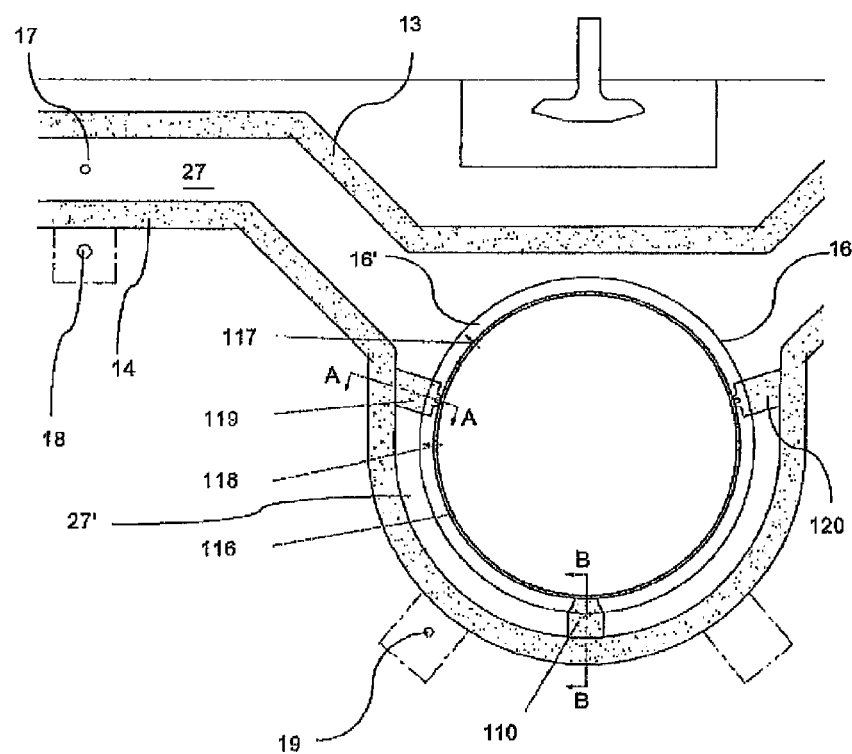
FIG. 5 shows an enlarged part of the plate of FIG. 2.

FIG. 5 shows the aforementioned elongated pipe 116 which preferably is removably received in the passage 16' through the package of plates. The pipe 116 is provided with through-going apertures 117, 118 and has a length corresponding essentially to the length of the package, i.e. the distance between the endplates 3, 4 shown in FIG. 1; the apertures 117, 118 may be located in the upper part, such as in the upper half perimeter part, whereby particles settling in the pipe 116 due to the low flow rate will not obstruct the apertures until the point where a significant amount of particles have settled.

By way of example, the apertures 117, 118 may each have a diameter in the order of 2 mm, with the diameter of the flow ways 17, 18 being slightly larger than the diameter of the apertures 117, 118.

Shown in FIG. 5 is also a part of the first seal 14 which in the shown embodiment may have projecting parts 110, 119, 120 forming supports supporting the pipe within the passage 16'. The projecting parts may be configured to divide the distribution chamber 27 into two portions, an upper one supplying liquid to one set 17, 18 of flow ways and a lower one 27' supplying liquid to other flow ways 19 by dedicated apertures 118. This arrangement may be provided to control the distribution of liquid leaving the distribution chamber 27.

Figure 6:
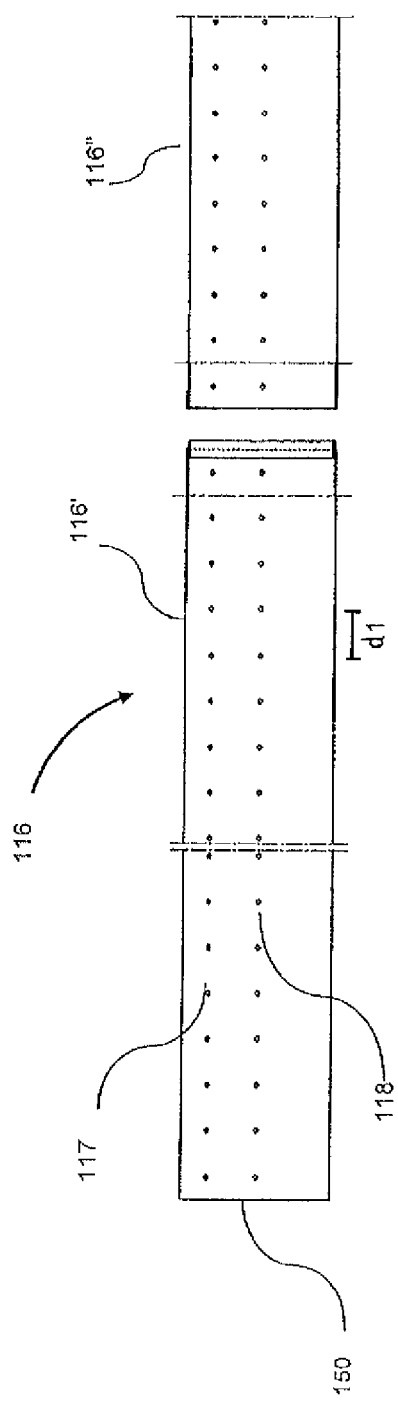
FIG. 6 shows a partial side view of two segments of the pipe to be inserted in a passage through the plate heat exchanger.

FIG. 6 is a side view of one embodiment of the pipe 116, showing two segments 116' and 116" thereof adapted to be sealingly connected. The pipe 116 is preferably closed at one end 150 where a port (not shown) may be provided allowing a tubing to be connected thereto with the aim of flushing the inside of the pipe with a cleaning fluid. The distance d1 between the apertures 117, 118 may be selected to correspond to the distance between the distribution chambers 27 whereby the apertures 117, 118 may be aligned therewith. In addition, the dimension of the apertures 117, 118 may be increasing towards the closed end 150, or the pipe may be tapering towards the closed end 150.

The apparatus according to FIG. 1-6 is intended to operate in the following manner. Liquid to be evaporated is pumped in a preheated condition through the inlet pipe 11 (FIG. 1) into the pipe 116 through the package of heat transferring plates, that is placed in the passage 16' formed by the openings 16 in the plates. From this pipe 116 the liquid flows through the apertures 117, 118 in the pipe wall and further out into the different distribution chambers 27 (FIG. 4), which extend across the whole width of the heat transferring plates (see the area 15 in FIG. 2). From the distribution chambers 27 the liquid flows through the holes 17 in the plates into the various transferring chambers 29 and then through the holes 18 out into the evaporation spaces 28. Simultaneously, liquid flows into the evaporation spaces 28 directly through the holes 19 from the plate interspaces in which the gaskets 24 (FIG. 3) surround the openings 16 and the holes 19. In the evaporation spaces 28 the liquid then runs downwardly in thin layers along the heat transferring plates, covering the opposing surfaces thereof.

Simultaneously there is supplied to the upper chamber 6 in the container 1 through the inlet 8 a heat emitting vapour which flows into the condensation spaces 30 through the slots between the edges of the heat transferring plates, as illustrated in FIG. 3. The heat emitting vapour condensates in the condensation spaces 30 upon its contact with the heat transferring plates to which it thus emits heat. This heat causes evaporation of the liquid running downwardly along the opposite sides of the plates in the evaporation spaces 28. Vapour formed in the evaporation spaces 28 leaves and flows out into the lower chamber 7 of the container 1 both sidewise and downwardly, as illustrated by means of arrows in FIG. 2. The generated vapour leaves the chamber 7 through the outlet 9, whereas unevaporated liquid is collected at the bottom of the container and is discharged—continuously or intermittently—through the bottom outlet 10 (FIG. 1).

Condensate formed by the heat emitting vapour in the condensation spaces 20 runs downwardly along the heat transferring plates and leaves the condensation spaces through the two channels formed by the holes 20 and 21 in the lower parts of the heat transferring plates. These channels are closed from communication with the evaporation spaces 28 by the gaskets 22 and 23 (FIG. 2). Even uncondensed parts of the heat emitting vapour leave the condensation spaces 30 through said channels and is discharged together with the condensate through the outlets 12 (FIG. 1).

As mentioned previously, the holes 18 are somewhat larger than the holes 17. The hole sizes are chosen such that during the operation of the apparatus a partial evaporation of evaporation liquid is obtained when the liquid passes through the holes 17. The holes 18 are made large enough so that the vapour pressure that will prevail in the transferring chambers 29 shall not exceed the vapour pressure prevailing in the heat emitting vapour in the condensation spaces 30. The purpose thereof is to guarantee that upon possible leakage past the gaskets 25 such leakage shall be directed into the transferring chambers 29 and not out of these chambers. Particularly if the to apparatus according to the invention is used for the production of fresh water from for instance sea water, it is better if vapour flows into the sea water than if sea water flows into the fresh water.

In the embodiment of the heat transferring plates 4 shown in FIGS. 2 and 3 each plate has holes 17-19 on both sides (both to the left and to the right) of the opening 16. If desired, the holes 17-19 may be excluded in every second plate on one side of the opening 16 and in the rest of the plates on the other side of their openings 16. Alternatively, the holes 17 may be excluded in every second plate on one side of the opening 16, and the holes 18 and 19 may be excluded on the other side of the opening 16, whereas in each of the rest of the plates the holes 17 may be excluded on said other side and the holes 18 and 19 be excluded on said one side of the opening 16. Even in these cases liquid will be distributed across the whole width of the plates in each of the evaporation spaces 28.

It has been assumed above that the sealing members arranged between the heat transferring plates are constituted by elastic rubber or plastic gaskets of the kind usually used in connection with heat transferring plates of thin pressed metal sheet. Of course, any other suitable kinds of sealing members may be used. As sealing means could also be chosen permanent interconnection of the heat transferring plates along the lines which in FIGS. 2 and 3 show how different gaskets are extending. The heat transferring plates may be pressed in a way such that they abut against each other along these lines in the respective plate interspaces, so that sealing between—possibly interconnection of—the plates is facilitated.

Figure 7:
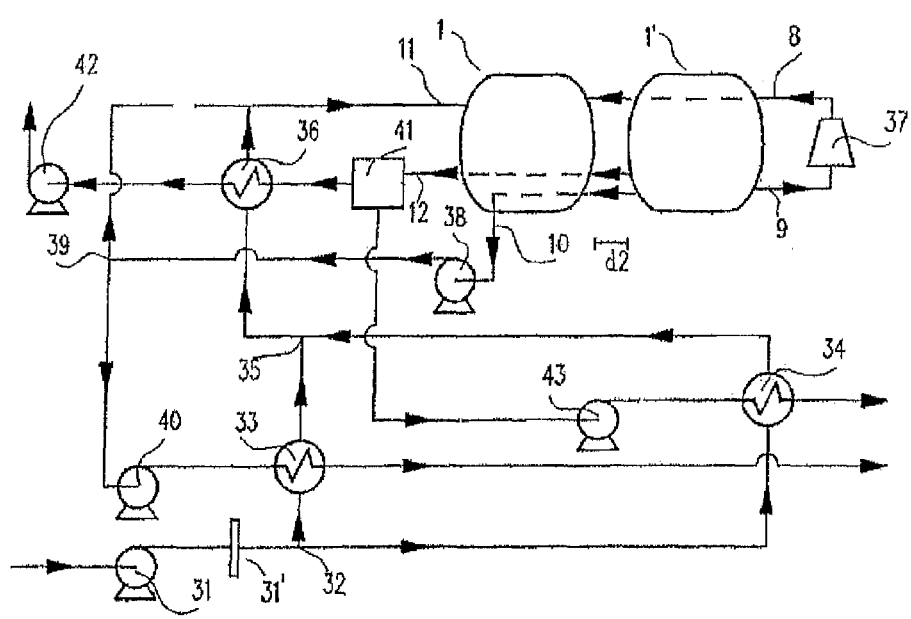
FIG. 7 shows a flow diagram of an apparatus for production of fresh water from sea water.

FIG. 7 shows a flow diagram of a plant in which the described apparatus is included. The plant is intended for the production of fresh water from sea water. Thus, FIG. 7 shows the container 1 with its inlet 8 for heat emitting vapour, its inlet 11 for liquid to be evaporated, i.e. sea water, its outlet 9 for generated vapour, its outlet 10 for concentrated liquid, i.e. sea water having not been evaporated, so called brine, and its outlet 12 for condensate, i.e. fresh water, and uncondensed parts of the heat emitting vapour. An additional housing or container 1' may as shown be arranged in an end-to-end relationship with the aforementioned container 1 to provide for a sequential processing of the brine. Where the spacing d2 between the two housings 1, 1' is smaller than the length of the pipe 116 removal of the pipe 116 for cleaning may be facilitated by making the pipe bendable or separable into segment as discussed with reference to FIG. 6 whereby the pipe 116 may be pulled out from the package of the one housing 1 towards the end wall of the adjoining housing 1' and removed sideways from the space between the two housings 1, 1'. By bendable is meant herein elastically bendable such that the pipe 116 will return to its original shape when an external bending force is released.

In operation, sea water is pumped by means of a pump 31 into the plant. After the pump 31 the sea water is run through a filter 31' and is then divided at 32 in two branch flows. One passes through a heat exchanger 33 and the other through a heat exchanger 34. The branch flows are then united at 35 and are pumped further on through another heat exchanger 36 to the inlet 11 of the container 1. The generated vapour leaving the container through the outlet 9 is transferred through a compressor 37 to the inlet 8 for heat emitting vapour. A conventional high pressure fan may serve as a compressor.

So called brine, i.e. sea water having not been evaporated in the container 1, is pumped by means of a pump 38 out of the container 1 through its bottom outlet 10 and is divided at 39 in two branch flows. One branch flow is returned to the container inlet 11 for liquid to be evaporated, whereas the other branch flow is pumped by means of a pump 40 through the heat exchanger 33 and out of the plant. In the heat exchanger 33 this branch flow emits part of its heat to one of the branch flows of incoming sea water.

A mixture of fresh water, i.e. condensate from the heat emitting vapour supplied through the inlet 8, and non-condensed residuals of this vapour are removed from the container 1 through the outlet 12. In a separator 41 the gaseous parts of the mixture are separated, and by means of a vacuum pump 42 they are sucked through the heat exchanger 36 and out of the plant. In the heat exchanger 36 they emit part of their heat to the already partly preheated incoming sea water.

The fresh water is pumped from the separator 41 by means of a pump 42 through the heat exchanger 34 and out of the plant. In the heat exchanger 34 the fresh water emits part of its heat to a branch flow of the incoming sea water.

In the described plant the incoming sea water preferably is preheated almost to a temperature corresponding to its boiling point at the evaporation pressure to be prevailing in the evaporation spaces of the plate heat exchanger. For instance, the sea water may be preheated so that it has a temperature of 55 DEG C. in the container inlet 11. The generated vapour in the container outlet 9 may have a temperature only insignificantly exceeding 55 DEG C. and a pressure of for instance 0.15 bars. The vapour may after that be compressed to having in the container inlet 8 and in the chamber 6 a pressure of about 0.19 bars and a temperature of about 59 DEG C.

From the description above follows that, although various embodiments of the invention have been described and shown, the invention is not restricted thereto, but may also be embodied in other ways within the scope of the subject-matter defined in the following claims.

The invention claimed is:

1. A plate evaporator apparatus of the falling film type comprising a housing having an inlet for liquid to be evaporated and having mounted therein a package of substantially vertically arranged heat transferring plates with plate interspaces, every second one of which forms an evaporation space for at least partial evaporation of said liquid and the other plate interspaces forming condensation spaces for at least partial condensation of a heat emitting vapour, and further comprising first seals which in an upper part of said plate interspaces forming evaporation spaces delimit distribution chambers, each of which being in liquid flow communication with at least one evaporation space by flow ways spaced apart along the width of the package, the heat transferring plates having in an upper part through openings aligned to form a passage which extends through the plate package, an elongated pipe connected to the inlet and extending in the passage along a length thereof, the pipe having a peripheral wall with apertures distributed along the length of the pipe and being in flow communication with the distribution chambers, for supplying the liquid to be evaporated from the inlet to the distribution chambers through the apertures, the pipe extending along the full length of the passage, said pipe having a first end connected to the inlet and having a normally closed openable fluid flow port at a second end.

2. The plate evaporator apparatus according to claim 1, including supports arranged along the periphery of the through openings, for supporting the pipe inside the through openings, said supports optionally being integrally formed with said first seals.

3. The plate evaporator apparatus according to claim 1, said apertures being formed exclusively in the upper half perimeter part of said pipe.

4. The plate evaporator apparatus according to claim 1, said apparatus comprising a plurality of said housings or packages arranged spaced apart in an end-to-end relationship, the pipe being defined by sealingly connected shorter pipe sections and/or the pipe being bendable.

5. The plate evaporator apparatus according to claim 1, said apparatus including a filter for said liquid to be evaporated being located upstream of the pipe.

6. A method of desalinating sea water by evaporation, the method comprising supplying sea water to the inlet of the plate evaporator apparatus of the falling film type according to claim 1.

7. A plate evaporator of the falling film type comprising a package of substantially vertically arranged heat transferring plates with plate interspaces, every second one of which forms an evaporation space for at least partial evaporation of a liquid and the other plate interspaces forming condensation spaces for at least partial condensation of a heat emitting vapour, and further comprising first seals which in an upper part of said plate interspaces forming evaporation spaces delimit distribution chambers, each of which being in liquid flow communication with at least one evaporation space by flow ways spaced apart along the width of the package, the heat transferring plates having in an upper part through openings aligned to form a passage which extends through the plate package, an elongated pipe connectable to a supply of the liquid and extending in the passage along a length thereof, the pipe having a peripheral wall with apertures distributed along the length of the pipe and being in flow communication with the distribution chambers, for supplying the liquid to be evaporated from an inlet to the distribution chambers through the apertures, said pipe extending along the full length of said passage, having a first end connected to said inlet and having a normally closed openable port at a second end.

8. The plate evaporator according to claim 7, including supports arranged along the periphery of said through openings, for supporting said pipe inside said through openings, said supports optionally being integrally formed with said first seals.

9. The plate evaporator according to claim 7, the apertures being formed exclusively in the upper half perimeter park of said pipe.

10. The plate evaporator according to claim 7, wherein at least two second seals are arranged in an upper part of each condensation space, horizontally spaced from each other along the heat transferring plates, each of said second seals delimiting between the heat transferring plates a transferring chamber that is closed from connection with other parts of the condensation space, the condensation spaces communicate with the surrounding of the plate package through the gaps formed between said second seals for receiving heat emitting vapour from above, and the heat transferring plates have at least one first hole connecting one of the transferring chambers with one of the distribution chambers and at least one second hole connecting the one of the transferring chambers with one of the evaporation spaces.

11. The plate evaporator according to claim 10, wherein at least every second heat transferring plate has said through holes arranged in pairs, said first hole in a pair of holes connecting a transferring chamber with a distribution chamber and said second hole connecting the same transferring chamber with an evaporation space.

12. The plate evaporator according to claim 10, wherein each heat transferring plate has vertical and horizontal edge portions, each of the distribution chambers extends horizontally between the vertical edge portions of the heat transferring plates and the inlet passage for evaporation liquid extends through the plate package substantially in the middle between said edge portions.

13. The plate evaporator according to claim 10, wherein each heat transferring plate has vertical and horizontal edge portions, and the condensation spaces communicate directly with the surrounding of the plate package along the vertical as well as the upper horizontal edges of the heat transferring plates.

14. The plate evaporator according to claim 10, wherein said first hole is smaller than said second hole.

15. A plate evaporator of the falling film type comprising:
    a package of substantially vertically arranged heat transferring plates with plate interspaces, wherein each second plate interspace forms an evaporation space for at least partial evaporation of a liquid, and the other plate interspaces form condensation spaces for at least partial condensation of a heat emitting vapour;
    first seals which delimit distribution chambers in an upper part of the plate interspaces forming evaporation spaces, each of the first seals being in liquid flow communication with at least one evaporation space by flow ways spaced apart along the width of the package, upper parts of the heat transferring plates each possessing through openings aligned and forming a passage which extends through the plate package;
    an elongated pipe positioned in the passage, extending along an entire length of the passage, and connectable to a supply of the liquid to be evaporated;
    the elongated pipe comprising a peripheral wall with apertures distributed along the length of the elongated pipe and in flow communication with the distribution chambers so that the elongated pipe accumulates particles from the liquid to be evaporated;
    the apertures configured for supplying the liquid to be evaporated to the distribution chambers through the apertures;
    the elongated pipe possessing a first end connected to an inlet, and a normally closed openable port at a second end configured to permit flushing of the elongated pipe through the normally closed openable port after opening of the port; and the elongated pipe being removable from the passage.

* * * * *